United States Patent
Briggs

[15] 3,690,151
[45] Sept. 12, 1972

[54] LEAK DETECTOR
[72] Inventor: Walton E. Briggs, Lynnfield, Mass.
[73] Assignee: Norton Company, Worcester, Mass.
[22] Filed: July 25, 1968
[21] Appl. No.: 747,505

[52] U.S. Cl. ................................................73/40.7
[51] Int. Cl. .............................................G01m 3/20
[58] Field of Search .......73/40.7, 40, 23; 250/41.9 S, 250/41.9 G

[56] References Cited
UNITED STATES PATENTS

| | | |
|---|---|---|
| 3,342,990 | 9/1967 | Barrington et al..........73/40.7 |
| 3,520,176 | 7/1970 | Becker ......................73/40.7 |

OTHER PUBLICATIONS

" Journal of Applied Physics," Vol. 18, January 1947, pages 39–41.

Primary Examiner—Louis R. Prince
Assistant Examiner—William A. Henry, II
Attorney—Oliver W. Hayes and Jerry Cohen

[57] ABSTRACT

Mass spectrometer leak detector and associated high vacuum pump and trace gas leak sample inlet connected so that the leak sample is fed to the outlet of the vacuum pump, backwards through the high vacuum pump and into the spectrometer. The invention is carried out through apparatus comprising a diffusion pump with a mass spectrometer connected to the pump inlet and a trace gas inlet connected to the diffusion pump foreline.

14 Claims, 7 Drawing Figures

LEAK DETECTOR

The present invention relates to mass spectrometer leak detectors and the like. Instruments of this type were first developed for use in leak testing the gaseous diffusion plant equipment in the Manhattan Project, circa 1943. These instruments have had substantial commercial application since then and are utilized today for leak testing semiconductor and microcircuit packages, heat exchangers, vacuum and chemical apparatus. Analytical mass spectrometers, and their associated vacuum pumping systems, of the general type used then and now for leak detection were developed in the 1930's. Basically, the leak detector started in 1943 with an analytical mass spectrometer tuned to a low molecular weight gas (helium) with some modifications made in the vacuum plumbing and pump selection to accommodate the leak detection task.

The early leak detector work is described in the articles of Nier et al. and Jacobs et al. in volume 18 of the Journal of Applied Physics (January 1947), pp. 30 – 33 and pp. 34 – 48 and by Thomas et al. in volume 17 of Review of Scientific Instruments pp. 368 – 372 (1946). See also Nier patent (U.S. Pat. No. 2,486,199) and Jacobs patent (U.S. Pat. No. 2,504,530).

The present invention was made as a result of operating present-state-of-the-art equipment in an unusual manner, an observation of a surprising result and a deduction, based on the observation and many years of experience in the art, as to possible substantial improvements in the art — serendipity, if you will. The incident is best described in connection with the drawings whose discussion, as a matter of U.S. Pat. Off. procedure, is deferred until a later point in this disclosure.

It is an object of the invention to provide a new method of operating a leak detector using conventional apparatus combinations (machines) or the improved apparatus combinations set forth herein.

It is an object of the invention to provide an improved apparatus combination for leak detection affording improved vacuum protection to the mass spectrometer or like gas-vulnerable gas analyzer instrument.

It is an object of the invention to gain substantial economy and simplification in leak detection including initial and operating costs of the apparatus and utilization by operators of varying skills.

In general, the invention comprises the connection of the gas sample inlet, which transmits a trace gas flow indicative of the leak measured, to the mass spectrometer via the high vacuum pump associated with the spectrometer (a diffusion pump or the like) with the trace gas flow going in the reverse direction through the pump before it reaches the spectrometer. The usual cold trap — expensive and inconvenient to purchase and to operate — may be eliminated. The usual high vacuum valving may be replaced in whole or at least in part by simpler valving. The vulnerability of the spectrometer to poor operation of the leak detector is decreased.

Other objects, features and advantages of the present invention will in part be stated hereinafter and will in part be obvious from this disclosure.

The invention is now specifically described with an initial portion of the specific description devoted to the prior art and the circumstances of conception of the present invention, and with reference to the accompanying drawings wherein.

PRIOR ART

Figure 1:
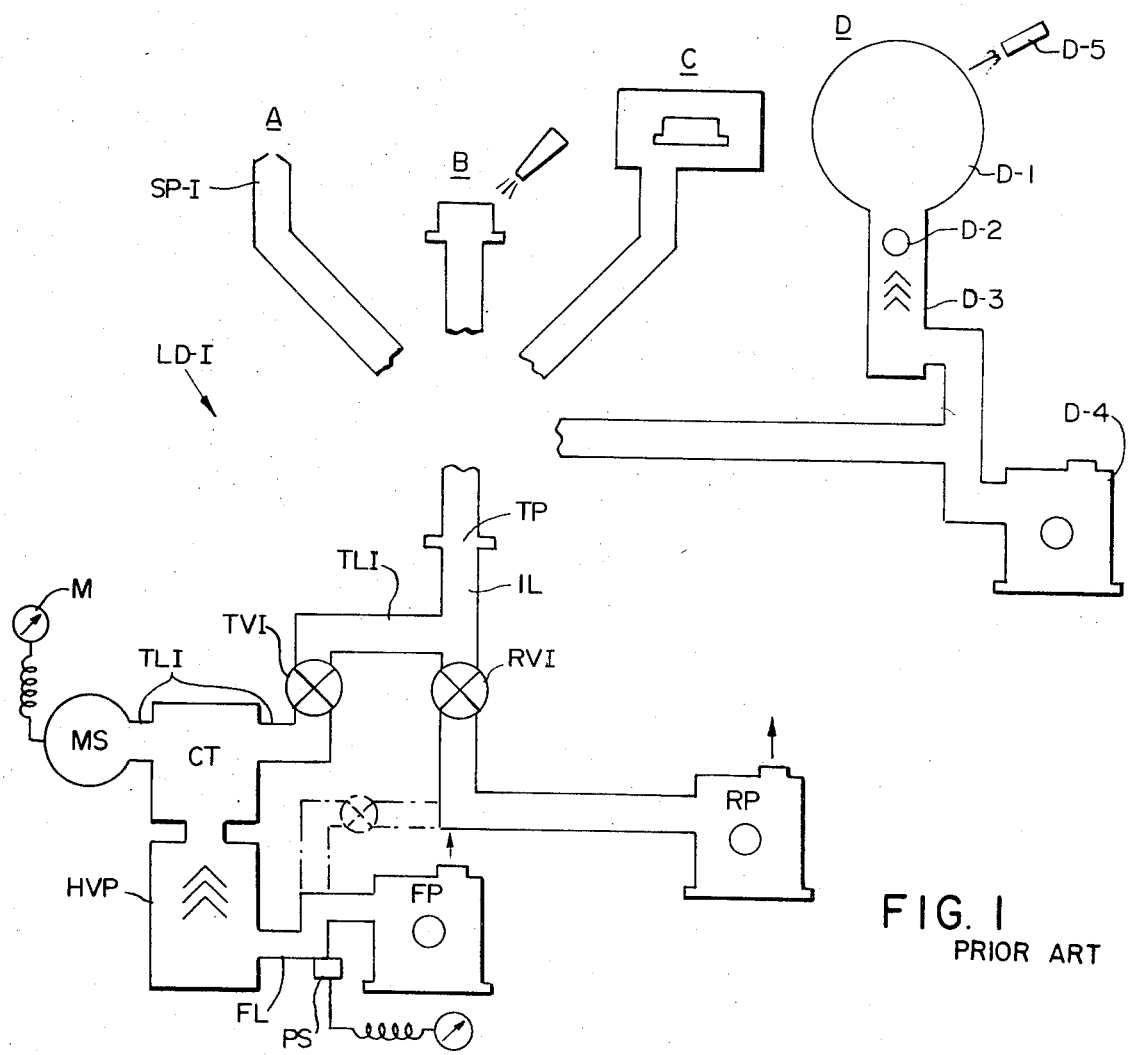
FIG. 1 is a schematic diagram of prior art leak detection apparatus.

FIG. 1 is a schematic diagram of a typical prior art apparatus combination(s). Any of the leak test arrangements A, B, C, D are connected to a test port TP. In arrangement A, leakage from a closed test piece, presaturated with trace gas is picked up by a sniffer probe SPI. In arrangement B, a test piece is evacuated and helium is sprayed over its exterior in zones of suspected leakage. In arrangement C, a presaturated test piece is placed in a vacuum chamber. In arrangement D, A tap-off is made from an existing vacuum system comprising a vacuum chamber D-1 (whose leak tightness is to be measured) evacuated by a cold trap D-2, a diffusion pump D-3 and a fore pump D-4. The leak testing tap-off is made at the diffusion pump foreline. The trace gas is a low molecular weight gas, i.e., hydrogen or helium or their isotopes.

The test arrangement is coupled to the leak detector 2D via a test port TP and inlet line. A roughing valve RVI is first opened to place the test arrangement in fluid communications via roughing line RL with a rotary mechanical pump of several cubic feet per minute capacity which serves as a roughing pump RP. The roughing pump pre-evacuates the test arrangement to remove the residual background of helium which is present in air in a ratio of 1 part per 200,000 and to help lower system total pressure to a level consistent with mass spectrometer operation — 0.0002 torr (mm. Hg) or less.

Meanwhile the gas analysis instrument, a mass spectrometer MS has been evacuated to the desired pressure via a cold trap CT, high vacuum pump (diffusion pump) HVP and a forepump FP connected to the foreline of the high vacuum pump.

Upon completion of the roughing step, roughing valve RVI is closed and test valve TVI is opened to place the test arrangement in communication with a test line TL which leads to the mass spectrometer via the cold trap CT. The cold trap pumps water vapor which is admitted with each leak detection sample and thus prevents the gradual deterioration of the mass spectrometer due to water vapor contamination. The cold trap also pumps backstreaming pump fluid from the pumps HVP and FP.

The forepump and roughing pump functions may be combined in a single pump by adding a foreline valve FV and an addition to the foreline as shown in dashed lines. Examples of this are in the old commercial M-1 leak detector of General Electric Co. and in U.S. Pat. No. 3,342,990. Various valve functions may be combined by the use of three and four way valves known in the art.

In testing, the leak detection gas sample, containing a partial pressure of trace gas proportional to the size of the leak detected, passes through test port TP, inlet line IL, test line TLI, cold trap CT and to the mass spectrometer which analyzes the trace gas content and displays the leak reading on meter M.

Various other conventional components are omitted from the drawing including various throttle valves, safety valves, check valves and pressure gauges which serve various accessory and safety functions for the leak detector. One such component which is shown, however, is the conventional pressure switch PS, an aneroid type pressure detector in the foreline which displays a reading of excess pressure or automatically shuts down the high vacuum pump when foreline pressure becomes too high. This component is shown because it had a part in the events leading to the present invention.

MAKING OF THE PRESENT INVENTION

Some conventional leak detector malfunctions were suspected to be traceable to leaky pressure switches. In order to evaluate this, a calibrated leak input of $6 \times 10^{-8}$ atmospheric cubic centimeters per second of helium was applied to the foreline and a reading was taken on the mass spectrometer. It indicated a leak of $6 \times 10^{-9}$. The calibrated leak was applied to the test port TP in the usual fashion and the reading of the mass spectrometer was then $6 \times 10^{-8}$ — indicating a loss of sensitivity of only 10 times attributable to "backwards" operation. The direct result of this test was an evaluation of the immediate problem and recommendation for improvements in pressure switch design and a balanced evaluation of the leakage problem associated with pressure switch PS (minor in view of the small loss of sensitivity). After some thought the indirect result of the test was the conception reported below.

METHOD

Leak detection apparatus may be operated by deliberately operating conventional leak detection apparatus (or apparatus as described below) by admitting the gas sample to the high vacuum pump foreline. As indicated in the above test, the loss of sensitivity may be as small as 10 times. This loss is quite tolerable considering that mass spectrometer leak detectors have sensitivities which enable them to sense a leak of $1 \times 10^{-11}$ or lower and that most leak detection problems involve leaks of considerably higher trace gas flow rate. Therefore a sacrifice in sensitivity of 10 or even 100 times is quite tolerable.

In return for this sacrifice in sensitivity, several important benefits are realized. First of all, the mass spectrometer protection is increased in comparison to the protection afforded by the usual test connection. As the leak sample works its way in reverse current fashion through the leak detector, water vapor and nitrogen and oxygen admitted with the gas sample are selectively removed to a much greater extent than in the conventional arrangement. Occasional bursts of higher leak rate, which would normally endanger the mass spectrometer and trigger safety devices are now readily disposed of by the higher pressure pumping capacity of the fore pump compared to that of the high vacuum pump. Interruption of testing is less frequent and measurement of gross leaks can be made without the use of special throttles or special test techniques.

APPARATUS

Figure 2:
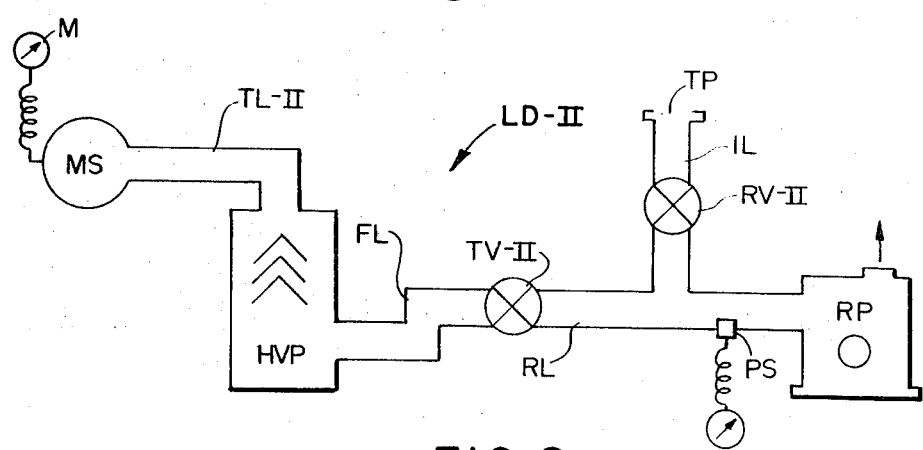
FIGS. 2, 3, 4, 5, 6 and 7 are schematic diagrams of various species of the present invention, the FIG. 2 apparatus being preferred for most applications except for sniffing type of leak detection, the FIG. 3 apparatus being preferred and distinctly advantageous for that purpose as indicated below.

FIG. 2 is a schematic diagram of leak detection apparatus according to the present invention. The leak detector, LD II, comprises a test port TP, inlet line IL, roughing line RL, test line TL II, roughing valve RV II, test valve TV II, mass spectrometer MS, meter M, high vacuum pump HVP and roughing pump RP. The high vacuum diffusion pump HVP constitutes essentially the sole molecular flow pump between the inlet and spectrometer. There is no cold trap. The roughing valve RV II, and test valve TV II are now located in high pressure lines and may therefore be of less stringent specification than their counterparts in FIG. 1 which are located in high vacuum regions or perform a high vacuum sealing function.

The operation of LD II involves initially pre-pumping the mass spectrometer MS in preparation for a day's operation via the single roughing pump RP and an open valve TV II and then via HVP, TV II, RP, valve RV II being closed all the while. Then a leak test may be made as follows. Test port TP is connected to any of the usual leak test arrangements as in FIG. 1. Valve TV II is closed and valve RV II is opened. The leak test arrangment is then pre-roughed, if necessary by pump RP. During the short roughing time, the foreline FL of pump HVP upstream of closed test valve TV II acts as a ballast tank. When the leak test arrangement is rough pumped, valve TV II is opened and leak testing is begun. During the leak testing pump RP serves as a forepump. Despite the fact that pump RP pulls inlet gas, including trace gas content, away from the test line it appears that this source of sensitivity loss, together with sensitivity losses in traversing the diffusion pump are quite low. A portion of any trace gas admitted through test port TP will migrate backwards through pump HVP and reach mass spectrometer MS with only tolerable losses. Between leak tests in a series of tests on one test arrangement, the pumps HVP and RP clear the background of trace gas from the instrument. After the series of leak tests, valve RV II is closed and the test arrangement is uncoupled from TP. The apparatus affords the same degree of protection described above in connection with the method of the present invention. In addition, the elimination of the cold trap and several high vacuum components of the valves and plumbing affords a considerable saving in initial cost and maintenance and operating cost of the leak detector. Also, operation is simplified for the novice operator and the margin of safety is greater thus allowing the more widespread industrial use of mass spectrometer leak detectors. The apparatus can measure a wide variety of gross leaks now measured only through the use of special accessories or special operator skill in conventional equipment. Moreover, the "sacrifice" of sensitivity in the FIG. 2 construction is partially attenuated by the omission of the cold trap and its inherent gas flow impedance.

ANALYSIS

Having made the invention, it is possible to explain it retrospectively in terms of knowledge of the pump used. It has long been known that certain high vacuum pumps, e.g., diffusion pumps, are selective in their pumping effects (speed and compression ratio) on certain gases. Excellent surveys of pump theory with good bibliography spanning 50 years of vacuum pump development are given by Florescu in an article entitled "Critical Survey on the Physics of High Vacuum Vapor Pumps" in Vacuum Magazine, vol. 13, p. 569 (1963) and by Power in his book "High Vacuum Pumping Equipment" (Chapman and Hall, London, 1966). Note particularly chapter two on oil and mercury vapor pumps. Additionally, pressure ratio data for pumping light gases based on experiments utilizing a reverse flow of gas through high vacuum pumps are given in Review of Scientific Instruments, 33: 985 (1962) (Apgar, Levin, Mullaney) and 1963 AVS Transactions, p. 147 (Bancroft, Ed. 1964) (Power, Dennis, de Csernatony). See also p. 205 of the Power book). Leak detector high vacuum pumps have always been selected for sufficiently low helium speed to allow helium trace gas to accumulate at the mass spectrometer for improvement of sensitivity.

In my above described leak detector operation (which was conducted with the FIG. 1 type apparatus, specifically a leak detector as described in my U.S. Pat. No. 3,327,521 including a 0.7CFM forepump in continuous operation) the pressure ratio for helium must have been extremely low (assumed ratio of about 10 corresponding approximately to the measured sensitivity loss and which is very low compared to ratios of several hundred or more based on direct measurement of pressure by Apgar et al. for hydrogen and helium and by Power for hydrogen). In most diffusion pump operations, pressure ratios of a million times a million (or greater) are more common despite the fact that gases pumped may traverse the pump back and forth several times. However, the typical leak detector diffusion pump has low power input, low power efficiency and low air speed as a whole and weak cooling where air rather than water is used as a convenient coolant. All these factors favor the so-called diffusion theory of pump operation as opposed to the impart bombardment theory (see Power book, pp. 50–55) and would also favor realization of an extremely low helium pressure ratio. One consequence of this which is utilized in the present invention is that helium admitted to the foreline of the high vacuum pump can reach the pump inlet and then the mass spectrometer with a sensitivity loss of only about 10 times. The implications of this for leak detector methods and apparatus are as described herein.

APPARATUS DETAILS

Referring again to FIG. 2, the preferred equipment choices are as follows:

MS — Model NRC 925-20, see U.S. Pat. Nos. 3,265,890 and 3,277,295.

HVP — Model NRC HSA-150 pump, a 2-inch air cooled oil diffusion pump with an internal baffle affording an air speed of 150 liters per second (attenuated through the vacuum plumbing to 3–10 liters per second at the mass spectrometer.

RP — Welch 5 CFM rotary mechanical pump.

RV-II and TV-II — brass block valves, operated manually or by solenoids (solenoid valves have been displaced by motorized valves in the present state-of-the-art of leak detection).

The MS and RP components may be substituted by any conventional substitute. For instance, MS could be a radioactive detector (for tritium trace gas), a double deflection mass spectrometer or a cold cathode mass spectrometer (see U.S. Pat. No. 3,342,990 describing a spectrometer of this type) or an ionization gauge or ionization pump calibrated for leak detection operation. The RP component could be a cryopump or cryosorption roughing pump or pump array (however, this is substantially less preferred since it involves working with cryogenic fluids or refrigeration).

The high vacuum pump for use within the scope of the present invention may be any of the common commercial 2-inch and, in most instances, 4-inch diffusion pumps as presently available today. Ejector pumps and molecular drag pumps can be modified to make them suitable. In all cases the pump will display an over-all air speed suitable for clearing out the mass spectrometer volume in a short time in accordance with standards well known to those skilled in the art (e.g., one complete gas turnover in the spectrometer per second is the rate mentioned in the above cited U.S. Pat. No. 3,342,990) and will display a low pressure ratio for low mass trace gas. The pump will be of a type having an inlet and foreline and constructed to produce a high vacuum at its inlet (the pressure of $10^{-3}$ torr or lower) and have a forepressure above high vacuum level ($10^{-3}$ torr or more — typically 0.1 – 1 torr for diffusion pumps). Generally, the power to throughput ratio will be about 1.5 or more (in kilowatts of rated power divided by rated speed times 0.001 torr) in contrast to the 1.0 rating of most modern diffusion pumps.

ADDITIONAL SPECIES

Figure 3:
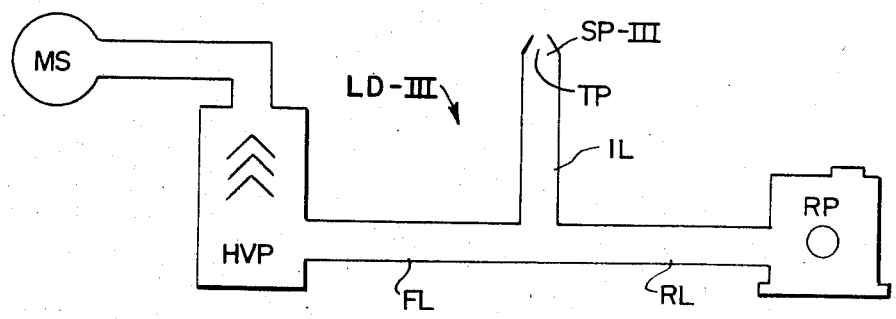

FIG. 3 shows a second species of the invention involving the adaption of the FIG. 2 apparatus for use in sniffing (compare with leak test arrangement A of FIG. 1).

In the FIG. 3 apparatus the sniffer probe inlet throttle is constructed with an enlarged opening to provide a flow inlet of 0.1 or more atmospheric cubic centimeters per second, in contrast to the present state-of-the-art limitation of about 0.001 atmospheric cubic centimeters per second of gas admitted. This larger rate of gas admission is made possible by the apparatus combination of the instant invention and affords improved probe sensitivity in detecting smaller leaks because of greater probability of capture of trace gas coming through the leak. The probe sensitivity improvement in the sniffing mode of operation would at least in part offset the sensitivity loss inherently made in running the trace gas backwards through the high vacuum pump. Additionally the common problem of probe plugging is greatly reduced.

The FIG. 3 species can be made as a single purpose (sniffing) leak detector with the roughing and test valves of FIG. 2 eliminated. The sniffing probe, per se, would constitute the test port inlet and its throttle structure would allow rough pumping to proceed. Alternatively, an enlarged sniffing probe can be attached to the test port TP of FIG. 2.

Figure 4:
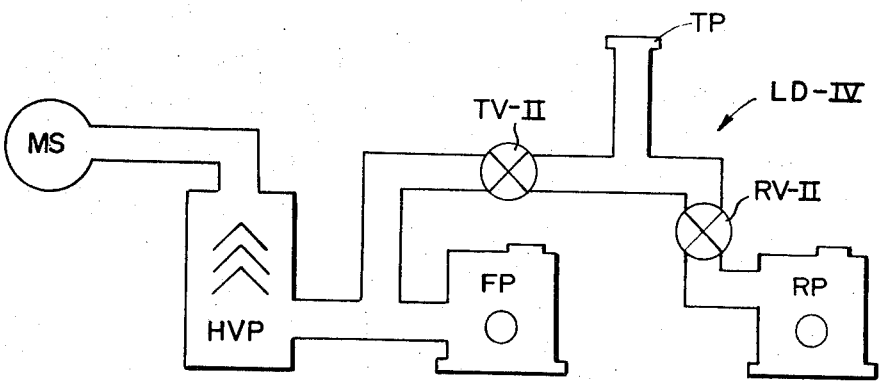

Referring to FIG. 4, another species is shown wherein separate mechanical pumps are provided for forepump (FP) and rough pump (RP) functions. Valving and plumbing can be otherwise in accord with the FIG. 2 species.

Figure 5:
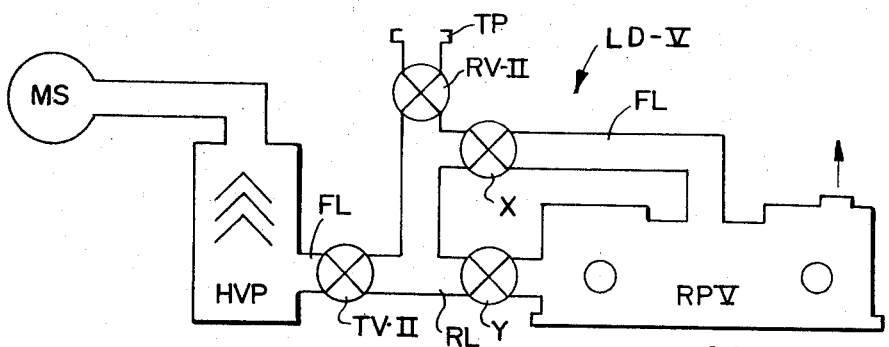

Referring to FIG. 5, there is shown a species using a two-stage roughing pump RP V. The test port inlet line, roughing line, high vacuum pump and spectrometer are as in FIG. 2.

In this FIG. 5 species, valves X and Y are used to alternatively provide flow through both pump stages for roughing and only through the second stage for forepumping during leak testing. The lower forepumping capacity during leak testing imposes less loss of leak test sensitivity than the full rough pumping capacity.

Figure 6:
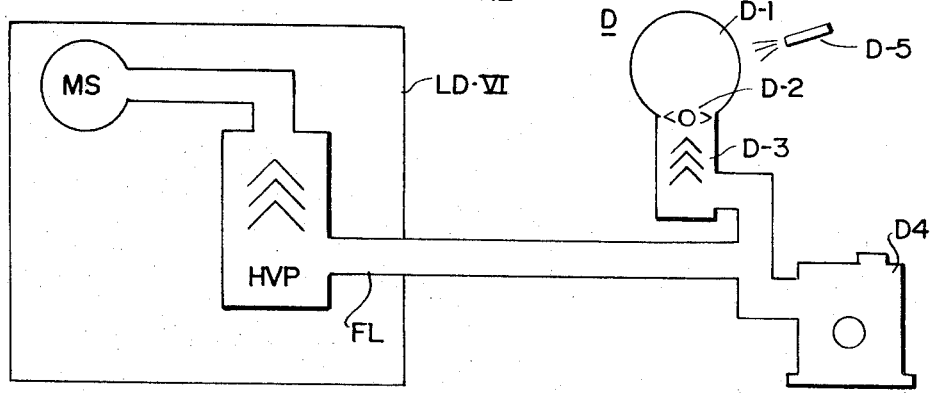

Referring to FIG. 6 there is shown a leak detector LD VI consisting of the mass spectrometer MS (and, of course, its meter, not shown), and the high vacuum pump HVP including its foreline FL. Any arbitrary point along the length of the foreline may be considered as the test port TP for trace gas inlet purposes.

This apparatus is connected to the pumping system of a vacuum chamber whose leak tightness is to be checked (compare arrangement D of FIG. 1). The usual valving of vacuum arrangement D can be used to serve the leak detector as well in accordance with the present invention.

An additional species of the method involves reducing or limiting trace gas pressure ratio of the high vacuum pump, particularly limiting oil temperature in an oil diffusion pump through lower heater power. This has the distinctly advantageous feature that it can achieve full or even improved sensitivity of the instrument while moving the sample in the reverse direction through the pump to achieve the other advantages set forth above. This species can be understood best with reference to in illustrative and non-limiting Example:

The apparatus of FIG. 2 was constructed using the apparatus set forth above under APPARATUS DETAILS with the exception that the pump RP was an 0.7 CFM mechanical pump. The HSA 150 diffusion pump was operated at its rated heater voltage of 115 volts and a calibrated leak of $4.6 \times 10^{-8}$ was applied to the test port TP. The apparatus was used as explained above and the meter reading for the leak was $8 \times 10^{-9}$, a sensitivity reduction of about 6 times. Then the heater voltage was reduced in stages as follows and the following leak readings were made:

```
95V    1.6×10⁻⁸,   better than full sensitivity
90V    1.2×10⁻⁷,
85V    2×10⁻⁷
80V    6.2×10⁻⁷,  a ten times increase
                   in sensitivity.
```

In order to understand how an accurate leak reading can be in excess of the test leak applied, it should be noted that the meter M was calibrated for normal operation of a prior art instrument (FIG. 1). It should also be noted that the roughing pump speed in this species was lower than for the preferred embodiment of FIG. 2 and this aided the improvement in sensitivity.

In practicing the method commercially one should limit trace gas pressure ratio in the high vacuum pump during test only and have full trace gas pressure ratio available between tests to quickly clear the instrument. One should also increase fore pump speed between tests. This can be done in any of the above apparatus species through power reduction and/or gas throttle valves.

Figure 7:
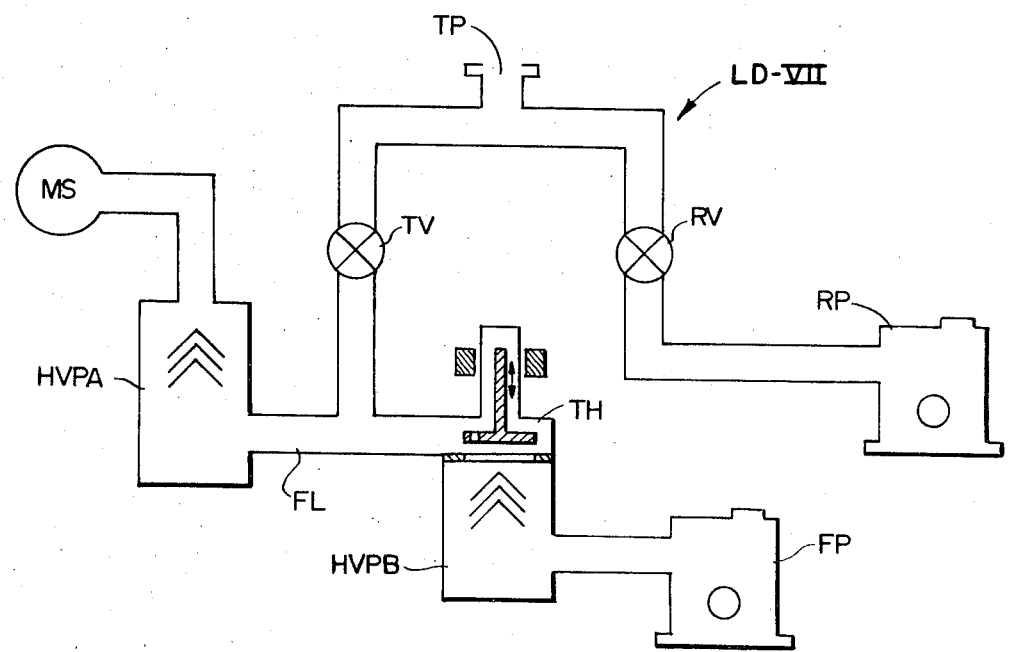

An additional apparatus species utilizing the above method to advantage is shown in FIG. 7 using a different approach to reconciling the improved sensitivity during testing of the above method and good speed for clearing the instrument between tests. In this species, the apparatus has two diffusion pumps in series, HVPA and HVPB, the latter acting together with mechanical pump FP to form the forepumping system for pump HVPA. Pump HVPA would have a lower pressure ratio for trace gas than pump HVPB (e.g., both pumps being 2 inch oil diffusion pumps with HVPA having two-thirds as much power as pump HVPB. The test arrangement is roughed by pump RP via valve RV. The testing is carried out by closing valve RV and admitting the leak sample via test valve TV to the foreline FL of diffusion pump HVPA. During testing a throttle plate TH (a plate with an orifice in it) is dropped over the inlet of pump HVPB to reduce the effective pump speed of HVPA to about 3 liters per second. After testing the throttle plate is lifted out of the blocking position by a magnet to restore full speed.

The advantages of this apparatus in terms of sensitivity speed and economy would be great compared to FIG. 1 and on the whole the initial cost of the system would be about equal to or less than that of FIG. 1. As in the other apparatus species of FIGS. 2 – 6, this species would eliminate the operating cost and inconvenience of a cold trap and provide simplicity of operation and protection of the mass spectrometer.

The speed improvement can be illustrated with reference to structures which can be used for the valve TV. The valve structure described in U.S. Pat. No. 3,327,521 opens the test valve over a 12 second transition period. By using the patented valve structure in the FIG. 7 species here (or any of the other species of the present invention) the transition period can be reduced to about 4 seconds or less. Similarly the high speed system of U.S. Pat. No. 3,385,102 could have its roughing and transfer time halved through utilization of the FIG. 7 species. In such a modification of the patent structure, the cold trap of the patent would be replaced by the diffusion pump HVPA described here and the high vacuum port of the patent structure would be connected to the line between pump HVPA and the existing diffusion pump of the patent structure. The valve of the patent structure could be speeded up because of the faster clean up of the previous test cycle.

Additional advantages of the FIG. 7 structure in combination with the patent structure compared to the patent structure above are that sensitivity is further enhanced at the lower background pressures produced in foreline FL by pump HVPA (less than $10^{-3}$ torr) and that gaskets in the valve structure are usable for a longer time without changing.

Another modification of the invention is to run a test line into a diffusion pump below the inlet and below one or more pump stages and above the foreline. In this arrangement, the test line may be thought of as a parallel branch of the foreline which is "connected" to the foreline.

What is claimed is:

1. Apparatus for leak detection comprising
    a. means, such as inlet port, for providing a trace gas inlet for connection to a source of leak test trace gas b. a gas analysis instrument for sensing trace gas in proportion to its quantity or rate of change of quantity
c. high vacuum pump means, comprising a diffusion pump
d. said diffusion pump having a pump inlet in fluid communication with said instrument and a foreline
e. forepump means in fluid communication with the foreline for compressing gas in the foreline to atmospheric pressure and
f. gas flow connecting means connecting said inlet means (a) to said foreline so that the path for flow of trace gas from the inlet means (a) to the instrument (b) goes through said diffusion pump foreline, then through said diffusion pump (c), then through said pump inlet before reaching the instrument (b).

2. The apparatus of claim 1 further comprising (g) test valve means located in said gas flow connecting means (f) for selectively blocking trace gas from the diffusion pump when the valve is in a position corresponding to no test and for admitting trace gas flow from the inlet means (a) to the foreline in a valve means position corresponding to test.

3. The apparatus of claim 2 further comprising (h) rough valve means between the test valve means and inlet means and clear of the connection between the test valve means and fore pump means.

4. The apparatus of claim 1 wherein the trace gas inlet means comprises sniffer probe means constructed and arranged to provide inlet flow of at least 0.1 atmospheric cubic centimeters per second.

5. The apparatus of claim 1 further comprising rough pump means, separate from said fore pump means and test valve means providing communication between said inlet and foreline during leak testing and between said inlet and rough pump between leak tests.

6. Leak detection apparatus comprising a gas analysis instrument tuned to detect trace gas, means forming a trace gas inlet and a diffusion pump with an inlet and foreline, the said instrument being connected to the pump inlet and the said trace gas inlet being connected to the pump foreline so that trace gas, flowing from the trace gas inlet to the instrument is required to traverse the diffusion pump in a direction contrary to the direction of increasing total pressure in the pump and further comprising forepump and rough pump means connected to the foreline.

7. The apparatus of claim 1 wherein said rough pump and forepump means comprise a single pump.

8. The apparatus of claim 6 wherein said rough pump means and forepump means comprise separate pumps.

9. The apparatus of claim 6 wherein said inlet comprises a sniffer probe with a sufficiently large opening to provide a flow of at least about 0.1 atmospheric cubic centimeters per second.

10. The apparatus of claim 6 with roughing valve means blocking said inlet and test valve means blocking said foreline in alternation with the blocking of said inlet by the roughing valve means.

11. Leak detection apparatus comprising a gas analysis instrument tuned to detect trace gas, means forming a trace gas inlet, a first diffusion pump with an inlet and foreline, the said instrument being connected to the inlet of the first diffusion pump and the said trace gas inlet being connected to the foreline of the first diffusion pump, and forepump means including a second diffusion pump connected to the foreline of the first diffusion pump.

12. The apparatus of claim 11 wherein said first diffusion pump has a lower pressure ratio for the trace gas than the second diffusion pump.

13. The apparatus of claim 12 further comprising means for limiting effective speed of the second diffusion pump during testing.

14. Leak detection apparatus comprising a gas analysis instrument, a diffusion pump with an inlet and a foreline and trace gas inlet forming means connected in flow series, with the gas analysis instrument connected solely to the diffusion pump inlet and the trace gas inlet connected to the diffusion pump foreline and bypassing the diffusion pump inlet.

* * * * *